United States Patent [19]

Von Lempke

[11] Patent Number: 5,145,700

[45] Date of Patent: Sep. 8, 1992

[54] PROCESS FOR PREPARING A SOYA FOOD PRODUCT

[76] Inventor: Frederick E. Von Lempke, 170 Derby Road, Kensington, Johannesburg, Transvaal, South Africa

[21] Appl. No.: 709,576

[22] Filed: May 29, 1991

[30] Foreign Application Priority Data

May 30, 1990 [ZA] South Africa ............ 90/4158

[51] Int. Cl.$^5$ ............................................. A23L 1/00
[52] U.S. Cl. ........................... 426/240; 426/311; 426/507; 426/634
[58] Field of Search ............ 426/634, 240, 802, 507, 426/656, 311

[56] References Cited

U.S. PATENT DOCUMENTS 3,925,568 12/1975 Rao et al. ........................ 426/634
4,103,034 7/1978 Ronai et al. ..................... 426/802
4,764,385 8/1988 Butland .......................... 426/240

Primary Examiner—George Yeung
Attorney, Agent, or Firm—Michael Best & Friedrich

[57] ABSTRACT

The invention provides a process for preparing a soya food product including the steps of providing a soya concentrate, and pre-mixing the soya concentrate with a composition including organic flavorants, an amino acid supplementation, an extract of a spice and vitamins. The pre-mixed product is then mixed with water at a temperature below 15° C. and then allowed to soak for a period of time sufficient to allow the soya concentrate substantially to absorb the composition. The process may further include a par-cooking step where the product is partially cooked by frying in an oil or fat medium at a temperature above 170° C. The process may also include a cooling step where the product is crust frozen at a temperature below −100° C.

17 Claims, No Drawings

PROCESS FOR PREPARING A SOYA FOOD PRODUCT

BACKGROUND OF THE INVENTION

This invention relates to a process for preparing a food product from soya which has the appearance and taste of real animal meats such as beef, chicken and fish. Typically the food product will be in the form of meat balls, sausages, hamburger patties, meat loafs, schnitzels, steaks and fish rissoles. In the past, the products of such processes suffered what is commonly called "flavour fatigue". This means that a person eating the product will experience unpleasant after-tastes. Past processes have also produced products with a relatively short shelf-life thus decreasing their marketability.

SUMMARY OF THE INVENTION

According to the present invention there is provided a process for preparing a soya food product including the steps of;
(a) providing a soya concentrate,
(b) pre-mixing the soya concentrate with a composition which includes organic flavourants, an amino acid supplementation, an extract of a spice, and vitamins,
(c) mixing the product of step (b) with water at a temperature below 15° C., and
(d) allowing the product of step (c) to soak for a period of time sufficient to allow the soya concentrate to substantially absorb the composition of step (b).

Further according to the invention the process further comprises either one or both of the following steps;
(e) a partial cooking step wherein the product of step (d) is partially cooked by frying in an oil or fat medium at a temperature above 170° C. and
(f) a cooling step wherein the product of step (b) is crust frozen at a temperature below −100° C.

Preferably the process will include both the par-cooking step followed by the cooling step.

DETAILED DESCRIPTION OF THE INVENTION

Before soya beans can be used in any processed soya food product, they are usually crushed, de-fatted and de-husked. Textured soya concentrate (TSC) and textured vegetable protein (TVP) and soya isolate are products freely available on the market and consist basically of crushed soya beans which have been de-fatted and de-husked. TSC, TVP, soya isolate and mixtures thereof are examples of ground soya which will, for the purposes of this specification, be referred to as "soya concentrate".

In a pre-mixing stage the soya concentrate is mixed with a composition which includes organic flavourants, an amino acid supplementation, an extract of spices and vitamins.

Numerous organic flavourants constitute a particular composition which has, for example, the taste of beef. By means of trial and error, combinations of different organic flavourants are tested for a desirable taste, and then, further tested for "flavour fatigue". Gas chromatographic methods are helpful in doing initial determinations of organic flavourants which are likely to taste like the particular real meat. These organic flavourants may comprise up to 50 or even more specific organic chemicals.

The amino acid supplementation will preferably comprise between 2.25 and 2.75%, more preferably 2.5% lysine, between 0.5 and 0.7%, more preferably 0.6% methionine and between 0.04 and 0.06%, more preferably 0.05% tryptophan by weight of the total soya mixture. The soya concentrate in its original form consists of about 50% by weight protein on a dry basis, the balance being carbohydrates, fibre and ash. The object of adding the amino acid supplementation is to bring the net protein utilization (NPU) value up to a minimum of 60%. The NPU value represents the percentage of protein in a product in a form which is readily taken up by the body. Another biological test commonly done on proteinaceous products is the protein efficiency ratio (PER). A common standard for PER value is that of casein which is a protein of milk. If casein is taken to have a 100% PER value then the object of adding the amino acid supplementation to the product of the invention is to bring the PER value to 200%. The soya concentrate will have an amount of protein in it which will vary according to its source. Typically a batch of soya concentrate originating from a particular source will be analyzed to determine the percentage protein in it. The amino acid supplementation will then be adjusted to give a desired PER of the product.

The spice flavourants which form part of the composition in the pre-mixing stage, are not natural spices. Natural spices are usually contaminated with a host of bacteria and molds. Extracts of spices are used, the use of which render the product much more bacteria free, thus improving the shelf-life of the product. However, if natural spices of strictly controlled quality are obtainable they can also be used in the composition and for the purposes of this specification can be considered to be extracts of spices. Extracts of spices will also, for the purposes of this specification include extracts of fresh vegetables for example onion.

Vitamins also form an essential part of the composition. The variety and amount of vitamins used are typically determined so as to closely resemble and even exceed that of the real meat, fish or poultry that the product is intended to resemble.

Optionally cake flour, binders such as egg albumin and wheat glutin, and minerals such as salt, zinc, iron or potassium can form part of the composition of the pre-mixing stage.

The next part of the process is the mixing step. Here the product of the pre-mixing stage is mixed with water, the water being at a temperature below 15° C. Typically the water will be at a temperature between 6° and 10° C. The water is added to the mixture at this low temperature in order to render the mixture formable in a forming machine. If the mixing were to be carried out at a higher temperature the mixture would absorb more moisture than if carried out at the lower temperature causing the product to gel and fall apart in later processing. Typically the mixing is carried out for between 15 and 20 minutes. At this stage the protein concentration of the product is between 15% and 18% by weight on a wet basis of the product.

The soya mixture is then allowed to soak in this flavour system with water for a sufficient period so as to allow the soya mixture to absorb the flavourants and retain them during subsequent processing. Typically the period will be between 15 and 20 minutes. It is not necessary to take positive steps, e.g. refrigeration, during the mixing and soaking steps to maintain the temperature below 15° C. Generally though the cold water will maintain the product below 15° C.

The next step in the process is the partial cooking stage. The purpose of this stage is to form a crust or "seal" around the product thus "sealing in" and enhancing the flavourants referred to above. The cooking is usually carried out by means of a conveyor frier, using vegetable oil or animal fat, operating at a temperature above 170° C. Preferably the temperature will be between 175° and 195° C. Preferably the oil or fat also contains the organic flavourants and extract of spices referred to above.

Following this step there is a cooling stage. The product can be fan cooled to a temperature of below 25° C. before entering a nitrogen freezer operating at an internal temperature of below −100° C. Typically the internal temperature of the nitrogen freezer will be between −100° C. and −130° C. There is an economic reason for fan cooling the product which is to reduce the amount of nitrogen required in the subsequent nitrogen freezing of the product. The purpose of the freezing step is to "crust freeze" the product which prevents spoilage after cooking. The product can then be removed and placed in a normal freezer to freeze the product solid.

In accordance with another aspect of the invention is a sauce, consisting of a soya concentrate with the amino acid supplementation as described above, together with additional flavourants for example chili, curry, tomato and onion, beef and onion, steak and onion etc. The product of the above process, when cooked in such a sauce, shows a weight gain in excess of 8% and can be as high as 15%. Normal meat products will lose from 15 to 30% of their weight during normal cooking procedures. The sauce will preferably be in a powder form to which the user can add water prior to cooking.

As an alternative to or prior to the freezing step of the process, the par-cooking step may be extended until the product is fully cooked. Typically the continuous frying conveyer will be extended into a dip tank containing the sauce as described above or the sauce may be sprayed onto the product, before entering a hot air and humidity tunnel which has a variable control on both temperature and humidity. Such an extension of the partial cooking step renders the product fully cooked, the texture enhanced, succulent and juicy and substantially microbiologically sterile. The product may then be packed in any suitable fashion, such as being canned or hermetically sealed under vacuum or gas. This packaged product will then preferably be irradiated with a dose of gamma radiation. Typically the dose of gamma irradiation will be 2 kilo grays. The gamma irradiation will render the product in a condition which will not spoil for approximately six months to a year even when the product is not refrigerated.

EXAMPLE

A soya concentrate of TSC (textured soya concentrate) and TVP (textured vegetable protein) was pre-mixed with a composition which included
(a) a roast beef organic flavourant (2.8% w/w),
(b) an amino acid supplementation of lysine (2.5%), methionine (0.6% w/w) and tryptophan (0.05% w/w),
(c) dehydrated fresh onion (7.0% w/w),
(d) a vitamin mix (0.7% w/w) of nicotinic acid, riboflavin, ascorbic acid, vitamin A acetate, vitamin B6 and vitamin B12,
(e) egg albumin (5.8% w/w) and wheat glutin (0.4% w/w) as binders, and
(f) cake flour (5.0% w/w).

All percentages are by weight of the total product including the soya concentrate.

Water (24% w/w) at a temperature of 6° C. was added to the pre-mix and mixed for 15 minutes. The product was allowed to soak for 20 minutes. The product was then put into a forming machine which formed the product into shapes which resembled meat balls. The product was then put on a conveyor frier. The frier used vegetable oil at a temperature of 180° C. The vegetable oil had the roast beef organic flavourants and extract of onion added to it. The product at this stage was partially cooked and had a crust surrounding it. The product was then fan cooled to a temperature of 22° C. and then put through a nitrogen freezer operating at −120° C. This froze the crust of the product. The crust frozen product was then put into a normal freezer so as to freeze the product solid.

I claim:
1. A process for preparing a soya food product including the steps of;
   (a) providing a soya concentrate,
   (b) pre-mixing the soya concentrate with a composition including organic flavourants, an amino acid supplementation, an extract of a spice and vitamins,
   (c) mixing the product of step (b) with water at a temperature below 15° C., and
   (d) soaking the product of step (c) for a period of time sufficient to allow the soya concentrate substantially to absorb the composition.
2. A process according to claim 1 which further includes a partial cooking step
   (e) wherein the product of step (d) is partially cooked by frying in an oil or fat medium at a temperature above 170° C.
3. A process according to claim 1 which further includes a cooling step
   (f) wherein the product of step (d) is crust frozen at a temperature below −100° C.
4. A process according to claim 2 wherein the partial cooking step (e) is carried out at a temperature between 170° C. and 195° C.
5. A process according to claim 3 wherein the cooling step (f) is carried out at a temperature between −100° C. and −130° C.
6. A process according to claim 1 wherein the water of step (c) is provided at a temperature between 6° and 10° C.
7. A process according to claim 1 wherein step (c) is carried out for between 15 and 20 minutes.
8. A process according to claim 1 wherein step (d) is carried out for between 15 and 20 minutes.
9. A process according to claim 1 wherein the composition of step (b) further includes at least one mineral.
10. A process according to claim 1 wherein the composition of step (b) further includes a cake flour and a binder.
11. A process according to claim 1 wherein the amino acid supplementation of the composition of step (b) includes between 2.25 and 2.75% weight lysine, between 0.5 and 0.7% weight methionine and between 0.04 and 0.06% weight tryptophan based on the weight of the total soya food product.

12. A process according to claim 11 wherein the amino acid supplementation of the composition of step (b) includes 2.5% weight lysine, 0.6% weight methionine and 0.05% weight tryptophan based on the weight of the total soya food product.

13. A process according to claim 2 which includes a further cooking stage wherein the product is further cooked in a humidified environment.

14. A process according to claim 1 wherein the food product is packed and then irradiated using a dose of gamma radiation.

15. A process according to claim 14 wherein the dose of gamma radiation is 2 kilo grays.

16. A process for preparing a soya food product including the steps of;
 (a) providing a soya concentrate,
 (b) pre-mixing the soya concentrate with a composition including organic flavourants, an amino acid supplementation, an extract of a spice and vitamins,
 (c) mixing the product of step (b) with water at a temperature below 15° C., and
 (d) soaking the product of step (c) for a period of time sufficient to allow the soya concentrate substantially to absorb the composition,
 (e) partially cooking the product of step (d) by frying in an oil or fat medium at a temperature above 170° C., and
 (f) crust freezing the product of step (e) at a temperature below −100° C.

17. A process according to claim 16 wherein prior to step (f) the product is fan cooled to a temperature below 25° C.

* * * * *